United States Patent [19]

Winfield

[11] Patent Number: 4,662,419
[45] Date of Patent: May 5, 1987

[54] BEADLOCK FOR TUBELESS TIRES

[75] Inventor: Mason C. Winfield, Orchard Park, N.Y.

[73] Assignee: Astronics Corporation, Orchard Park, N.Y.

[21] Appl. No.: 826,612

[22] Filed: Feb. 6, 1986

[51] Int. Cl.⁴ .................. B60B 25/22; B60C 15/02
[52] U.S. Cl. ........................... 152/381.6; 152/400
[58] Field of Search .................... 152/399–401, 152/389–391, 513, 516, 520, 381.5, 381.6

[56] References Cited

U.S. PATENT DOCUMENTS

| | | | |
|---|---|---|---|
| 3,999,587 | 12/1976 | Mitchell | 152/381.5 X |
| 4,122,882 | 10/1978 | Fisher et al. | 152/381.5 |
| 4,228,840 | 10/1980 | Okada | 152/400 |
| 4,393,911 | 7/1983 | Winfield | 152/520 X |
| 4,573,509 | 3/1986 | Smith et al. | 152/520 X |

FOREIGN PATENT DOCUMENTS 2082129  3/1982  United Kingdom ................ 152/513

Primary Examiner—David A. Scherbel
Attorney, Agent, or Firm—Shlesinger Fitzsimmons Shlesinger

[57] ABSTRACT

Nearly circular, generally C-shaped beadlocks, which are made from a generally rigid plastic material, are slightly flexible so that they can be inserted within a tubeless tire and snugly around the annular central section of a supporting tire rim of either the split rim or drop center variety. The confronting ends of the C-shaped beadlocks are secured together by releasable clips, which function to prevent the ends of the beadlock from separating during use at high speeds or at low speeds in run flat operation. At least certain embodiments of the beadlocks have a plurality of spaced ribs projecting from each side thereof to engage and retain the beads of a tire against dislodgment of a rim.

9 Claims, 7 Drawing Figures

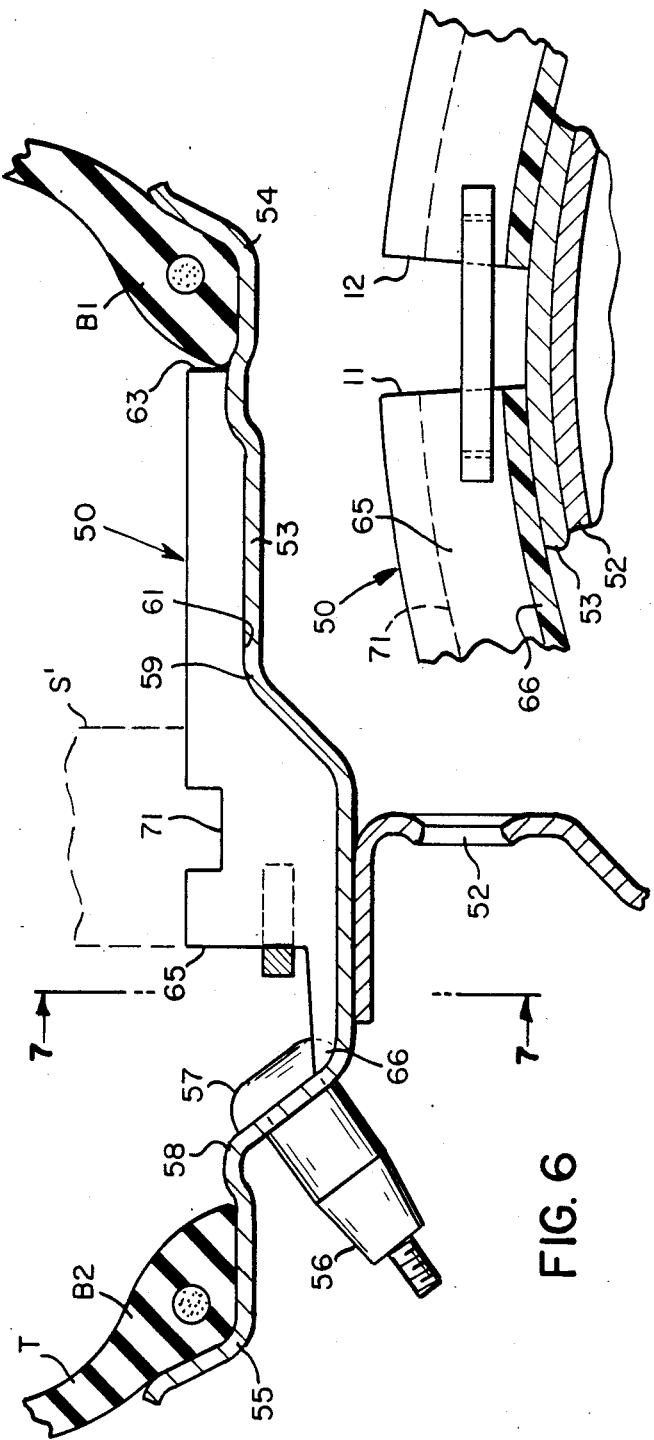

BEADLOCK FOR TUBELESS TIRES

BACKGROUND OF THE INVENTION

This invention relates to inflatable vehicle tires of the tubeless variety, and more particularly to improved beadlocks for preventing the opposed beads of a tire from becoming dislodged when operating in a flat or partially deflated condition. Even more particularly, this invention relates to a beadlock of the generally C-shaped variety, and removable clip means for preventing the ends of the beadlock from separating during use.

One of the major problems heretofore encountered when a tubeless tire fails, or becomes flat during use, is the tendency of the tire to shred and disintegrate if the vehicle is not immediately stopped. Efforts to overcome this problem have included the use of special, rim-mounted safety liners, such as shown for example in U.S. Pat. No. 4,173,243, and in my U.S. Pat. No. 4,393,911. The removable liners disclosed in these patents are mounted to rotate on circular or nearly circular, beadlocks or bearings, which surround the rims of the wheels upon which the tires are mounted. Should a tire fail during use it engages the outer periphery of the associated safety liner, which in turn rotates on the underlying beadlock, thus preventing any relative rotation between the liner and the tire itself. This permits the flattened tire to continue to operate in an almost normal manner for a prolonged period of time after its failure. Moreover, during this run-flat condition the opposed side edges of the associated beadlock or bearing tend to prevent the tire beads from becoming disengaged from the tire rim.

Although known such beadlocks may perform satisfactorily under certain conditions, such as for example when they are used in combination with a safety ring or liner of the type described above, they often are unsatisfactory when employed by themselves—i.e., without a surrounding safety liner or ring. For example, there are times when it is desirable to operate a vehicle with its tires partially deflated, or inflated below normal air pressure, such as for example when it is desired to achieve greater traction in mud, sand, snow, or the like. At such times the collapsed tread sections of the tires tend to pivot or swing the tire beads out of engagement with the beadlocks. Moreover, even when used with a surrounding safety liner, known beadlocks may not operate satisfactorily to prevent dislodgment of the beads of a flat tire from the associated tire rim.

The U.S. Pat. Nos. 1,379,915; 4,159,730 and 4,281,701 show a variety of beadlock designs which have sought to obviate these problems, but the solutions suggested in these patents are impractical and/or suitable for only limited uses.

Still another problem which is unique to generally C-shaped beadlocks of the type disclosed in applicant's above-noted patent, is that when the beadlocks are used without the surrounding safety liners, opposed ends of a beadlock tend to separate slightly at high speeds, thereby possibly allowing undesirable rotation of the beadlock relative to the associated rim.

It is an object of this invention, therefore, to provide an improved beadlock, which includes means for securely engaging and preventing the opposed beads of a tubeless tire from becoming dislodged from the associated tire rim, when the tire is employed in a partially inflated condition.

A further object of this invention is to provide an improved one-piece, generally C-shaped beadlock, which is disposed to be removably secured on a tire rim by one or more removable retaining clips which prevent undesirable separation of the confronting ends of the beadlock during use.

Other objects of the invention will be apparent hereinafter from the specification and from the recital of the appended claims, particularly when read in conjunction with the accompanying drawings.

SUMMARY OF THE INVENTION

One-piece generally C-shaped beadlocks are made from, for example, a tough, flexible plastic material so that they can be flexed slightly to permit the beadlock to be inserted grippingly over the outer peripheral surface of the rim of, for example, a two-piece wheel of the type commonly employed in military and commercial vehicles, or a one-piece drop center type of rim used on most automobiles. Each beadlock is provided along its opposed side edges with a plurality of angularly spaced, laterally projecting ribs, which engage the opposed beads of a tubeless tire, when the latter is mounted on the rim. Whenever the tire becomes deflated during use, the opposed tire beads are urged inwardly so that the confronting ends of the beadlock ribs imbed deeply into the tire beads to prevent disengagement of the beads from the tire rim.

In order to prevent undesirable rotation of the beadlock relative to the rim, as for example when the beadlock is not used in combination with a surrounding safety ring, the confronting ends of each beadlock are connected by one or more removable clips, which prevent separation of the beadlock ends at high speeds.

THE DRAWINGS

FIG. 5 is a fragmentary sectional view taken generally along the line 5—5 in FIG. 4 and looking in the direction of the arrows;

FIG. 6 is a fragmentary sectional view generally similar to FIG. 3, but illustrating a third form of this beadlock and associated clip means as they appear when mounted on the drop center type of tire rim for which they are designed to be used; and FIG. 7 is a fragmentary sectional view taken generally along line 7—7 in FIG. 6 looking in the direction of the arrows.

DETAILED DESCRIPTION OF THE PREFERRED EMBODIMENTS

Figure 1:
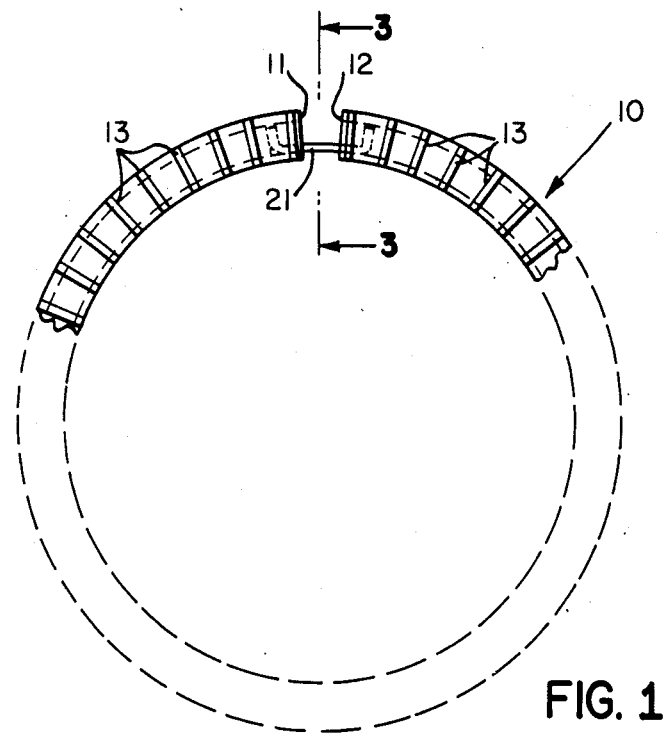
FIG. 1 is a side elevational view of a generally C-shaped beadlock and removable clip means therefor made according to one embodiment of this invention, part of the beadlock being shown in phantom by broken lines.
Figure 2:
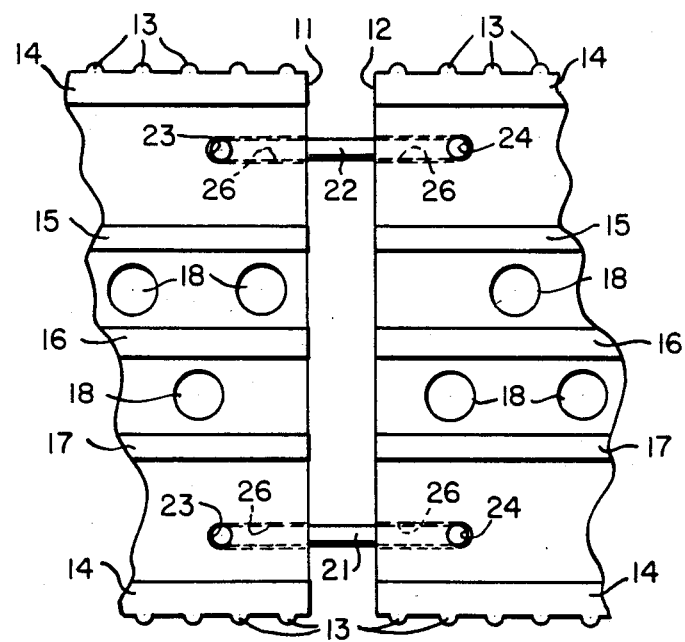
FIG. 2 is an enlarged fragmentary plan view of this beadlock.

Referring now to the drawings by numerals of reference, and first to FIGS. 1 to 3, 10 denotes a nearly circular, generally C-shaped beadlock, which is somewhat rectangular in cross section, and which has terminal ends 11 and 12 that lie in spaced, parallel planes. Projecting from each of the opposed, parallel side edges of beadlock 10 is a plurality of equi-angularly spaced radial ribs 13, which are disposed to engage the beads of a tire as noted hereinafter. Projecting from the outer peripheral surface of beadlock 10 at opposite ends thereof are two, outer circumferential end flanges 14. Also projecting from the outer periphery of the beadlock between the end flanges 14 are three, axially spaced, circumferential ribs 15, 16 and 17. If desired, these three ribs may be used to support on the beadlock a removable safety ring S, which is shown fragmentarily by broken lines in FIG. 3, and which may be made generally in accordance with the teachings in my above-noted U.S. Pat. No. 4,393,911.

Beadlock 10 has therethrough a plurality of spaced circular openings 18 which are used merely to reduce the overall weight of the beadlock.

The beadlock 10 is made from a generally rigid, long-wearing material, such as for example from a molded plastic material comprising a polyester elastomer of the type sold in E. I. du Pont de Nemours & Co. under the trademark "Hytrel". Because of its C-shaped configuration, the beadlock can be flexed first to reduce its outer diameter to permit its insertion into a tire, and thereafter to expand its inner diameter, if necessary, to permit the beadlock to be inserted over a tire rim as noted hereinafter.

Because of the flexible nature of the material from which beadlock 10 is made, its confronting ends 11, 12 sometimes have a tendency to separate when the beadlock is used on a wheel that is operated at high speeds. For this reason its ends 11 and 12 are adapted to be releasably connected together by a pair of generally U-shaped clips 21 and 22, opposite ends of which are disposed to be releasably inserted into two pairs of registering openings 23 and 24 (FIG. 2) that are formed in beadlock 10 adjacent opposite ends 11 and 12, respectively, thereof, and outwardly of ribs 15 and 17. As shown more clearly in FIGS. 1 and 2, the clips 21 and 22 are adapted to be inserted into the inner peripheral surface of beadlock 10 so that portions adjacent opposite ends thereof seat in corresponding recesses 26 formed in the inner periphery of the beadlock, whereby, when in use, the clips 21, 22 will not project beyond the inner peripheral surface of the beadlock.

Figure 3:
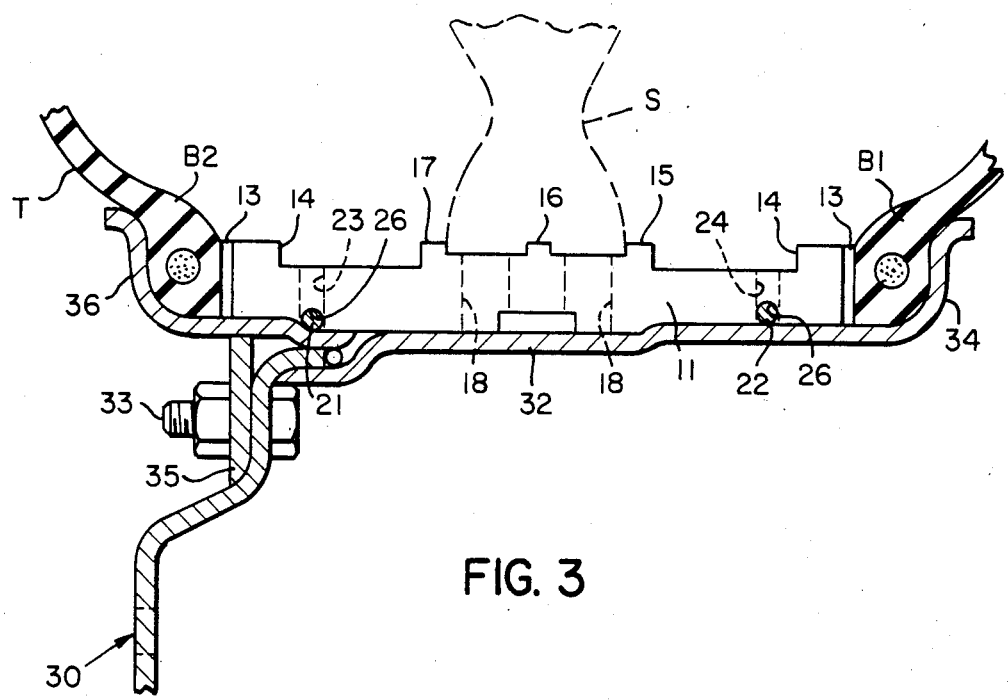
FIG. 3 is a fragmentary sectional view taken generally along the line 3—3 in FIG. 1 looking in the direction of the arrows, but showing also how this beadlock would appear when mounted on the rim of a two-piece wheel, and within an inflated, tubeless tire.

Beadlock 10 is particularly suited for use on conventional split rims, such as for example the type denoted generally by the numeral 30 in FIG. 3. Rim 30 comprises a central, tire supporting section 32, which is generally annular in configuration, and which has at one side thereof (the right side in FIG. 3) an integral, enlarged-diameter flange portion 34. Releasably attached to the opposite end of section 32 by conventional bolts 33 and a locking ring 35 is a removable, enlarged-diameter flange section 36, which is generally similar in cross sectional configuration to the stationary flange section 34.

To mount a beadlock 10 on a rim 30, and assuming that the locking rim 35 and flange 36 have been removed from the rim, the beadlock 10 is contracted slightly and inserted into the tire T. It is then permitted to return to its normal shape, and the clips 21 and 22 are then inserted in openings 23, 24. This assembly is then slipped coaxially onto the rim section 32 in such manner that the space between the beadlock ends 11 and 12 registers with the inner end of the tire valve (not illustrated), which is customarily used to supply compressed air to the interior of the tire. As beadlock 10 is urged coaxially onto the rim it forces the tire bead B1 against the rim flange 34; and it is followed by the other tire bead B2, which finally becomes lodged between the beadlock 10 and the flange 36, when the latter is thereafter secured on rim 30 by the locking ring 35. At this stage the beads B1 and B2 are lodged between opposite sides of the beadlock 10 and the flanges 34 and 36, respectively, so that when air under pressure is thereafter supplied through the associated valve stem to inflate the tire T, the ribs 13, which project from opposite sides of the beadlock 10, will penetrate at least partially into the confronting, inner surfaces of the tire beads B1 and B2.

A principal advantage of this construction is that when it is desired to drive the associated vehicle with partially deflated tires through mud, sand or snow, thus requiring greater traction, the flexing of the tire sidewalls tends, if anything, to cause the ribs 13 at opposite sides of the beadlock to become embedded even further into the registering portions of the tire beads B1 and B2, thus securely locking the beads against dislodgment from the tire rim. Moreover, whenever the beadlock is used without a surrounding safety liner S, the clips 21 and 22 prevent any undesirable separation of the confronting ends of the beadlock 10 when the associated wheel is rotated at high speeds.

Figure 4:
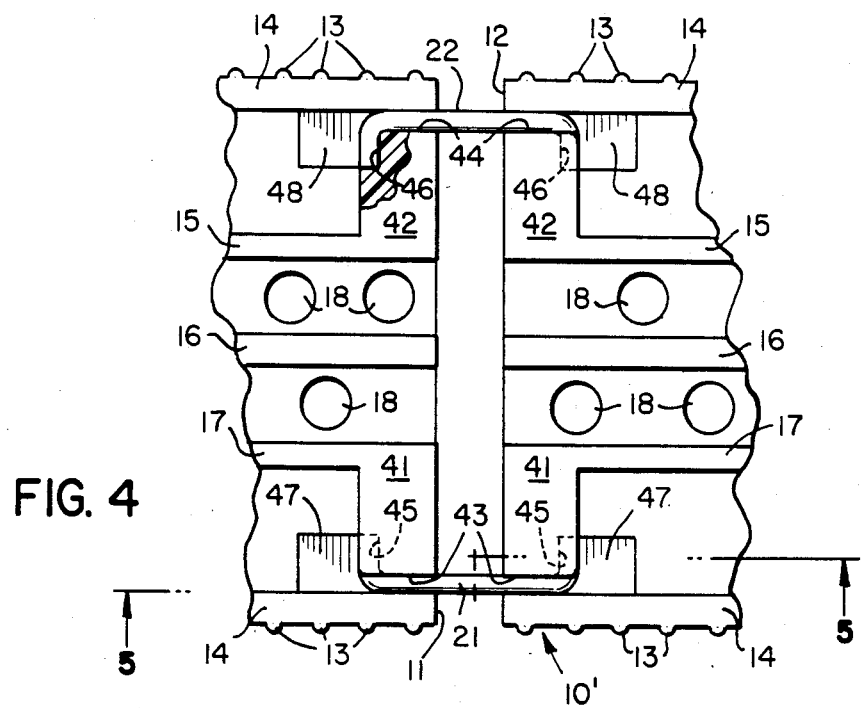
FIG. 4 is a fragmentary plan view generally similar to FIG. 2, but showing a second form of this beadlock and clip means.

In the embodiment shown in FIGS. 4 and 5, wherein like numerals are employed to denote elements similar to those shown in the first embodiment, 10' denotes a modified beadlock in which the clips 21 and 22 are inserted in the beadlock in such manner that opposite ends thereof extend parallel to the axial centerline of the beadlock, rather than extending transversely of the axis and the inner peripheral surface of the beadlock.

The beadlock 10' has formed thereon at each of its ends 11 and 12 a pair of spaced, integral, clip-engaging lugs 41 and 42. The two lugs 41 project from the outer side of rib 17 part way toward the adjacent end flange 14, while lugs 42 project from the outer side of rib 15 part way toward the other end flange 14. As a consequence, two, rather narrow, clip-accomodating grooves or spaces 43 are formed between one flange 14 and the confronting ends of the lugs 41; and two similar grooves or spaces 44 are formed in the beadlock 10' between the lugs 42 and the other end flange 14 which they confront upon.

To accomodate opposite ends of the clips 21 and 22, each of the lugs 41 and 42 is undercut or otherwise notched as at 45 and 46, respectively, along its inner edge, and in such manner that the notches 45 and 46 communicate with opposite ends, respectively, of the grooves 43 and 44, respectively. Also, the outer surface of the beadlock adjacent each of the notches 45 and 46 is provided with recessed, tapered surfaces 47 and 48, respectively, for guiding opposite ends of the clips 21 and 22 into the associated notches 45, 46, when the clips are mounted on the beadlock 10'.

In use, the beadlock 10' would be mounted on a rim in much the same manner as beadlock 10, except that the removable clips would be inserted by momentarily urging the two ends 11, 12 together long enough to permit opposite ends of the clips 21 and 22 to be inserted beneath the notched corners or inside edges of the lugs 41 and 42.

Referring to the embodiment shown in FIGS. 6 and 7, 50 denotes generally a C-shaped beadlock particularly suited for use with a drop center one-piece type of rim, which is typical of the type employed on standard automobiles. Such rims comprise a central wheel section 52 surrounded by a circular rim section 53 having integral therewith spaced, bead engaging flanges 54 and 55. Secured intermediate its ends in the rim 53 is the usual valve stem 56, the inner end of which projects as at 57 beyond the outer peripheral surface of rim 53, and into the drop center section, which is bound by a pair of axially spaced annular shoulders formed on the rim 53 as at 58 and 59.

The C-shaped beadlock 50, which may be made of the same material as beadlock 10, has an inner peripheral surface 61, which is identical in cross sectional configuration to the central portion of rim 53. In this embodiment, as well as in the preceding embodiments, the inner peripheral surface of the beadlock may have the desired accuracy simply by molding it directly against the outer surface of the rim 53—i.e., by using the rim as one wall of the mold.

In this embodiment the beadlock 50 is not designed to engage both tire beads B1 and B2. Instead, it extends at only one side thereof (the right side in FIG. 6) beyond the drop center section of the rim and toward the flange 54, so that the right hand side edge 63 thereof will engage the bead B1 of a tire T, when in use. Almost medially of the drop center section of rim 53 the beadlock 50 has formed thereon a plane, transverse end surface 65, which lies in a plane that extends normal to the axis of the beadlock. Projecting axially beyond the end surface 65 of the beadlock adjacent its inner peripheral surface is a thin, integral, generally annular lip section 66, which overlies the left hand portion of the drop center section of the rim as shown in FIG. 6, and which terminates at or adjacent the annular shoulder 58 on the rim. In any case, the circumferential outer edge of the lip section 66 is axially spaced from, and does not engage the other tire bead B2, when the beadlock is in use.

Beadlock 50 has in its outer periphery at least one annular groove 71 for accommodating a conventional, removable safety ring S' in the event that it is desired to use the beadlock in combination with such a ring. However, it is to be understood that, as in the case of the preceding embodiments, the beadlock 50 is particularly suited for use also without the safety ring S'.

For example, tests have indicated that, although only the inboard bead (B1) of the tire was positively secured by the beadlock surface 63 against being dislodged during operation of the associated tire in a run flat state, nevertheless the remainder of the tire (for instance the outboard beadlock B2) remained relatively stable and tended to follow along with the inboard bead so that the tire could be driven on for a number of miles despite being flat, and without any slippage of the beadlock relative to the tire rim.

From the foregoing it will be apparent that the present invention provides a relatively simple but extremely reliable means for preventing undesirable dislodgment of the tire beads of an inflatable, tubeless tire, when the latter is operated in a flat or deflated condition. When a tire is mounted on a split rim of the type denoted at 30, its beads become securely lodged between the opposed sides of the associated beadlock 10 or 10', and the overlying flanges 34, 36 that are located at the opposite sides of the rim. More importantly, when the tire becomes deflated during use, the arrays of ribs 13, which project from opposite sides of the respective beadlock, tend to become embedded even further into the associated tire beads thereby increasing the force with which the beads are properly retained on the rim.

Another advantage of the beadlocks of the type disclosed herein is that they may be employed on a tire rim either with or without an associated safety liner or ring of the type disclosed in my above-noted U.S. Pat. No. 4,393,911.

Moreover, by using the removable clip means 21, 22 or 57, any accidental or undesirable separation of the confronting beadlock ends during operation of a beadlock at high speed, or for that matter in a low speed, run - flat condition, is eliminated. Also, beadlocks of this type can be designed for operation on split rims of the type shown by way of example at 30, or on drop center type rims denoted at 53. In either case, the space or gap between the confronting ends 11, 12 of the C-shaped beadlock are always positioned in registry with the inner end of the associated valve stem, such as for example end 57 in FIGS. 6 and 7.

While in the embodiments of the beadlock as shown in FIGS. 1–5 the bead engaging projections have been in the form of spaced radial ribs 13, it will be readily apparent to one skilled in the art that the exact configuration, number and disposition of the bead-engaging projections can be altered without departing from this invention, provided they perform the function of securing the tire beads against dislodgment from the rim in a manner similar to that described above. Furthermore, instead of molding the beadlocks from "Hytrel", it would be possible to use other plastic materials of similar quality. Also, of course, other means of releasably securing the ends of the beadlocks against separation would be apparent to one skilled in the art without departing from this invention.

While this application has been illustrated and described in detail in connection with only certain embodiments thereof, it will be apparent that it is capable of still further modification, and that this application is intended to cover any such modifications as may fall within the scope of one skilled in the art or the appended claims.

I claim:

1. A beadlock for tubeless tires, comprising a one-piece, flexible, generally C-shaped member which is nearly circular in configuration, and which is disposed to be secured releasably around the generally annular center section of a conventional tire rim, and with the space between the opposed confronting ends of the member registering with the inner end of a valve stem on said rim, and means for removably securing said member around a tire rim, including removable clip means releasably securing together said confronting ends of said member to prevent accidental separation thereof during rotation of said rim on a vehicle, said member having therein at least one circumferential groove in its outer peripheral surface, and having a pair of axially extending projections formed in said groove adjacent opposite ends thereof, and said clip means comprising at least one generally U-shaped clip opposite ends of which are releasably seated in a pair of axially extending recesses formed in said member beneath said projections.

2. A beadlock as defined in claim 1, wherein
said member has thereon opposed, circumferential side edges extending transversely of the axis of said member, and
a plurality of spaced projections are formed on said side edges of said member to project axially therefrom into gripping engagement with the adjacent bead of the tire mounted on said rim, thereby to resist rotation of said tire relative to said member and said rim, when in use.

3. A beadlock as defined in claim 2, wherein said projections comprises a plurality of cylindrically shaped pins.

4. A beadlock as defined in claim 2, wherein said projections comprise a plurality of angularly spaced, radially extending ribs.

5. In combination with a tubeless tire and a one-piece rim having a drop-center section surrounded by said tire, a valve stem opening at its inner end on said drop-center section, and enlarged diameter end flanges overlying the outer surfaces of the beads of said tire, a beadlock, comprising
a flexible, one-piece, generally C-shaped member surrounding one side of said drop center section of said rim within said tire, and having opposed side edges one of which registers with said drop center section, and the other of which confronts upon and engages the inner surface of one of said tire beads, and
means releasably securing said member on said rim for rotation therewith, and with the space between opposite, confronting ends of said C-shaped member registering with the inner end of said valve stem,
said means comprising at least one retaining clip removably secured at opposite ends thereof to the confronting ends, respectively, of said member and extending therebetween to resist separation of said confronting ends during rotation of said rim and member.

6. The combination as defined in claim 5, wherein
said one clip is generally U-shaped in configuration and has opposite ends thereof releasably seated in a pair of openings formed in said member adjacent opposite ends thereof.

7. The combination as defined in claim 5, wherein
said member extends partway only into said drop-center section of the rim, and said one of said opposed side edges of said member is axially-spaced from the other of said tire beads.

8. The combination as defined in claim 5, wherein
said member has in its outer peripheral surface at least one generally annular recess for rotatably supporting a safety ring on said member.

9. In combination with a tubeless tire and a rim having an annular central section surrounded by said tire, a valve stem opening at its inner end on said central section, and enlarged diameter end flanges overlying the outer surfaces of the beads of said tire, a beadlock, comprising
a flexible, one-piece generally C-shaped member surrounding said central section of said rim within said tire, and having opposed side edges at least one of which confronts upon and engages the inner surface of one of said tire beads, and
means releasably securing said member on said rim for rotation therewith, and with the space between the opposite, confronting ends of said C-shaped member registering with the inner end of said valve stem,
said means comprising at least one retaining clip removably secured at opposite ends thereof to the confronting ends, respectively, of said member and extending therebetween to resist separation of said confronting ends during rotation of said rim and member,
said rim having a drop-center central section, and said one side edge of said member engaging one of said tire beads, and the other side edge of said member being axially spaced from the other of said tire beads,
said member having thereon intermediate its opposed side edges a plane surface extending transversely of the axis of said member, and
said retaining clip being generally U-shaped in configuration and having opposite ends thereof releasably seated in axially extending recesses formed in said transverse surface adjacent opposite ends, respectively, of said member.

* * * * *